(12) United States Patent
Sato

(10) Patent No.: US 6,727,957 B1
(45) Date of Patent: Apr. 27, 2004

(54) EXTERNAL SYNCHRONIZING SYSTEM AND CAMERA SYSTEM USING THEREOF

(75) Inventor: Masaaki Sato, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/393,834

(22) Filed: Sep. 10, 1999

(30) Foreign Application Priority Data

Sep. 14, 1998 (JP) .......................................... 10-259794

(51) Int. Cl.[7] ................................................ H04N 5/08
(52) U.S. Cl. ...................................... 348/526; 348/312
(58) Field of Search ................................ 348/525, 526, 348/529, 312

(56) References Cited

U.S. PATENT DOCUMENTS

| | | | | |
|---|---|---|---|---|
| 4,375,101 A | * | 2/1983 | Cerracchio ................... | 386/124 |
| 4,860,101 A | * | 8/1989 | Pshtissky et al. ............ | 348/518 |
| 5,151,786 A | * | 9/1992 | Kawamoto ................... | 348/529 |
| 5,153,725 A | * | 10/1992 | Masaike ....................... | 348/525 |
| 5,327,175 A | * | 7/1994 | Kim ............................. | 348/526 |
| 5,485,220 A | * | 1/1996 | McNeilly et al. ............ | 348/525 |
| 5,633,688 A | * | 5/1997 | Choi et al. ................... | 348/525 |

* cited by examiner

Primary Examiner—Wendy R. Garber
Assistant Examiner—Matthew L Rosendale
(74) Attorney, Agent, or Firm—Frommer Lawrence & Haug LLP; William S. Frommer

(57) ABSTRACT

When a field is determined by using a counter, a number of gates are needed in fabricating the counter and accordingly, the circuit scale is magnified and high cost formation is resulted. According to the invention, in a timing control circuit for separating a horizontal synchronizing signal and a vertical synchronizing signal included in a compound synchronizing signal CSYNC by a synchronizing separator circuit and forming an internal horizontal synchronizing signal and an internal vertical synchronizing signal based on a horizontal synchronizing signal Sep-HD and a vertical synchronizing signal Sep-VD after the separation, pulses P2 and P3 formed in a procedure of synchronizing separation at the synchronizing separator circuit, are utilized for determining a field in a field determining circuit and when the compound synchronizing signal CSYNC is inputted as an external synchronizing signal, whether the field is an odd number field or an even number field is determined.

10 Claims, 6 Drawing Sheets

EXTERNAL SYNCHRONIZING SYSTEM AND CAMERA SYSTEM USING THEREOF

BACKGROUND OF THE INVENTION

1. Field of the Invention

The present invention relates to an external synchronizing system and a camera system using the external synchronizing system for operating the system based on a synchronizing signal on the basis of a television system provided from outside, particularly to an external synchronizing system and a camera system using the external synchronizing system which uses a compound synchronizing signal including a horizontal synchronizing signal and a vertical synchronizing signal as an external synchronizing signal.

2. Description of the Related Art

In a monitor camera system, normally, synchronization is established in a slave camera by using a synchronizing signal (horizontal synchronizing signal, vertical synchronizing signal, compound synchronizing signal including these) of a master camera. This is a well-known technology referred to as external synchronization. According to the external synchronization, there is carried out a processing of matching a phase of a synchronizing signal of the slave camera to that of a synchronizing signal of the master camera. In this case, finally, video signals are inputted from a plurality of cameras to one monitor.

However, there causes a difference in a time period for the synchronizing signal of the master camera to reach the respective slave camera owing to a difference in a delay amount of a transmission line in accordance with a location of installing the slave camera and when the slave camera is locked, there is produced an image causing a deviation in synchronization on the monitor.

Therefore, in each of the salve cameras, the deviation in the synchronization on the monitor is eliminated by carrying out phase adjustment relative to the synchronizing signal provided from the master camera such that an amount of the deviation in the synchronization caused on the monitor is absorbed. Further, based on the synchronizing signal which has been subjected to the phase adjustment, a synchronizing signal such as a horizontal synchronizing signal or a vertical synchronizing signal used on the side of the slave camera is formed.

Specifically, a horizontal synchronizing signal and a vertical synchronizing signal included in a compound synchronizing signal provided from the master camera are subjected to synchronizing separation, phase adjustment is carried out in respect of the horizontal synchronizing signal which has been subjected to the synchronizing separation, the phase of an internal horizontal synchronizing signal formed on the side of the slave camera is synchronized with the external horizontal synchronizing signal after the phase adjustment and in the meantime, a vertical counter for carrying out counting operation at a period of 1H (H; horizontal scanning time period) is reset by the vertical synchronizing signal which has been subjected to the synchronizing separation and a vertical synchronizing signal on the side of the slave camera is formed based on a count value since a load value (reset value) at resetting operation.

However, in a television system for carrying out interlace scanning, one screen (one frame) comprises two fields of an odd number (ODD) field and an even number (EVEN) field and as shown by FIG. 6, a format of the synchronizing signal differs depending on the odd number field and the even number field. When the format of the synchronizing signal differs depending on the field as mentioned above, when informing a vertical synchronizing signal on the side of the slave camera, the reset value which is loaded to the vertical counter in the resetting operation needs to differ depending on the odd number field and the even number field.

Therefore, whether the field in inputting the external compound synchronizing signal is the odd number field or the even number field, needs to determine and conventionally, the field is determined by a phase relationship between the vertical synchronizing signal and the horizontal synchronizing signal after the synchronizing separation. Specifically, there is used a field determining circuit having a constitution in which counting operation is carried out in synchronism with a horizontal synchronizing signal by using a counter and a field is determined by polarities of the horizontal synchronizing signal at a certain timing after detecting an edge of a vertical synchronizing signal.

However, according to the above-described conventional field determining circuit, there is constructed the constitution of using the counter, a number of gates are needed in fabricating the counter and therefore, there poses a problem in which the circuit scale is magnified and the cost is increased.

SUMMARY OF THE INVENTION

The present invention has been carried out in view of the above-described problem and it is an object thereof to provide an external synchronizing system and a camera system using the external synchronizing system capable of firmly determining a field by a simple circuit constitution.

According to an aspect of the present invention, there is provided a camera system for forming an internal horizontal synchronizing signal and an internal vertical synchronizing signal based on a compound synchronizing signal including a horizontal synchronizing signal and a vertical synchronizing signal provided from outside for carrying out an operation of the camera system in synchronism with the formed internal horizontal synchronizing signal and the formed internal vertical synchronizing signal, the camera system comprising a synchronizing separator circuit for separating the horizontal synchronizing signal and the vertical synchronizing signal from the compound synchronizing signal and outputting a first and a second pulse having a constant phase difference therebetween with one horizontal scanning time period as a unit with a horizontal synchronizing portion of the compound synchronizing signal as a reference, a first pulse forming circuit for forming a third pulse having a pulse width in correspondence with the phase difference between the first and the second pulses, a second pulse forming circuit for forming a fourth pulse at a timing of fall of the vertical synchronizing signal separated by the synchronizing separator circuit and a third pulse forming circuit for forming a field identifying pulse based on the third pulse and the fourth pulse.

According to the camera system having the above-described constitution, the first pulse forming circuit forms the third pulse which rises at a timing of the first pulse and falls at a timing of the second pulse. The third pulse constitutes a pulse for determining fields of odd number and even number. The second pulse forming circuit detects fall of the vertical synchronizing signal after synchronizing separation and forms the fourth pulse. The fourth pulse constitutes a pulse for detecting fall of the vertical synchronizing signal. Further, the third pulse forming circuit identifies the fields of odd number and even number in accordance with polarities of the field identifying pulse at a timing of the pulse for detecting fall of vertical synchronizing signal.

The present invention is applicable to a system constituted by any apparatus which needs to operate by establishing external synchronization by using a compound synchronizing signal other than a monitor camera system comprising a master camera and one or more of slave cameras. For example, there are conceived an external synchronization system in which the master apparatus is a camera and the slave apparatus are constituted by a plurality of VCRs and the external synchronization system in which both a master apparatus and one or more of slave apparatus are constituted by VCRs or Video Tape Recorders (VTRs) and so on.

DETAILED DESCRIPTION OF THE PREFERRED EMBODIMENTS

Figure 1:
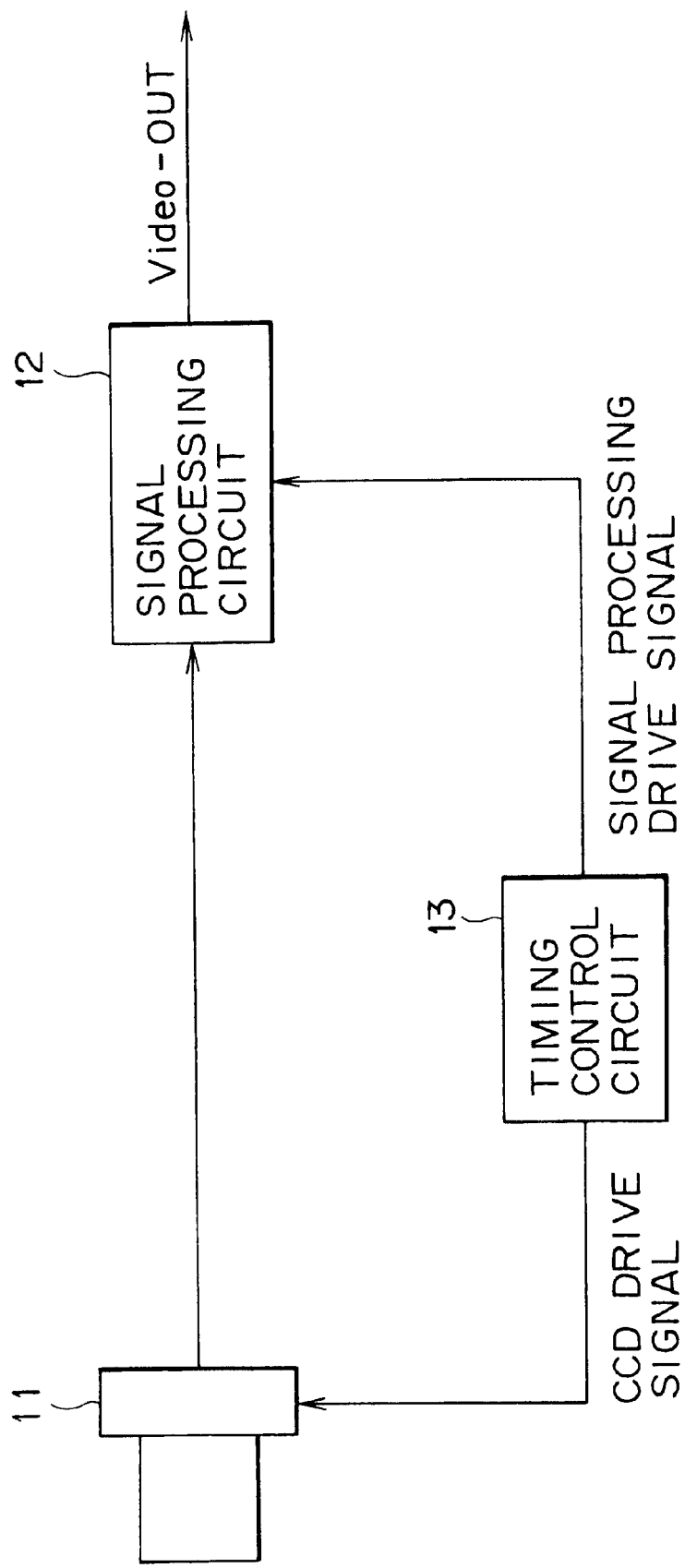
FIG. 1 is an outline constitution diagram showing an example of a constitution of a camera system to which the present invention is applied.

A detailed explanation will be given of embodiments according to the present invention as follows. FIG. 1 is an outline constitution diagram showing an example of a constitution of a camera system to which the present invention is applied.

Here, an explanation will be given of an example of a case of a constitution realizing a signal processing system of a camera in analog, however, the present invention is naturally similarly applicable to a case of a constitution realizing the system in digital. Further, the camera system is used for a slave camera in, for example, a monitor camera system and there is adopted a system in which a compound synchronizing signal including a horizontal synchronizing signal and a vertical synchronizing signal is used as an external synchronizing signal based on a television signal provided from a master camera.

In FIG. 1, an output signal from a CCD image element 11 (CCD signal) is inputted to a signal processing circuit 12. The signal processing circuit 12 is constituted to include a circuit of sampling and holding the output signal from the CCD image element 11 (S/H circuit), a circuit of amplifying a sampled and held output thereof to a constant level (AGC circuit) and a circuit for converting the CCD signal into a video signal. A timing control circuit 13 is installed for forming a CCD drive signal for driving the CCD image element 11, a signal processing drive signal for driving the signal processing circuit 12 and the like.

Figure 2:
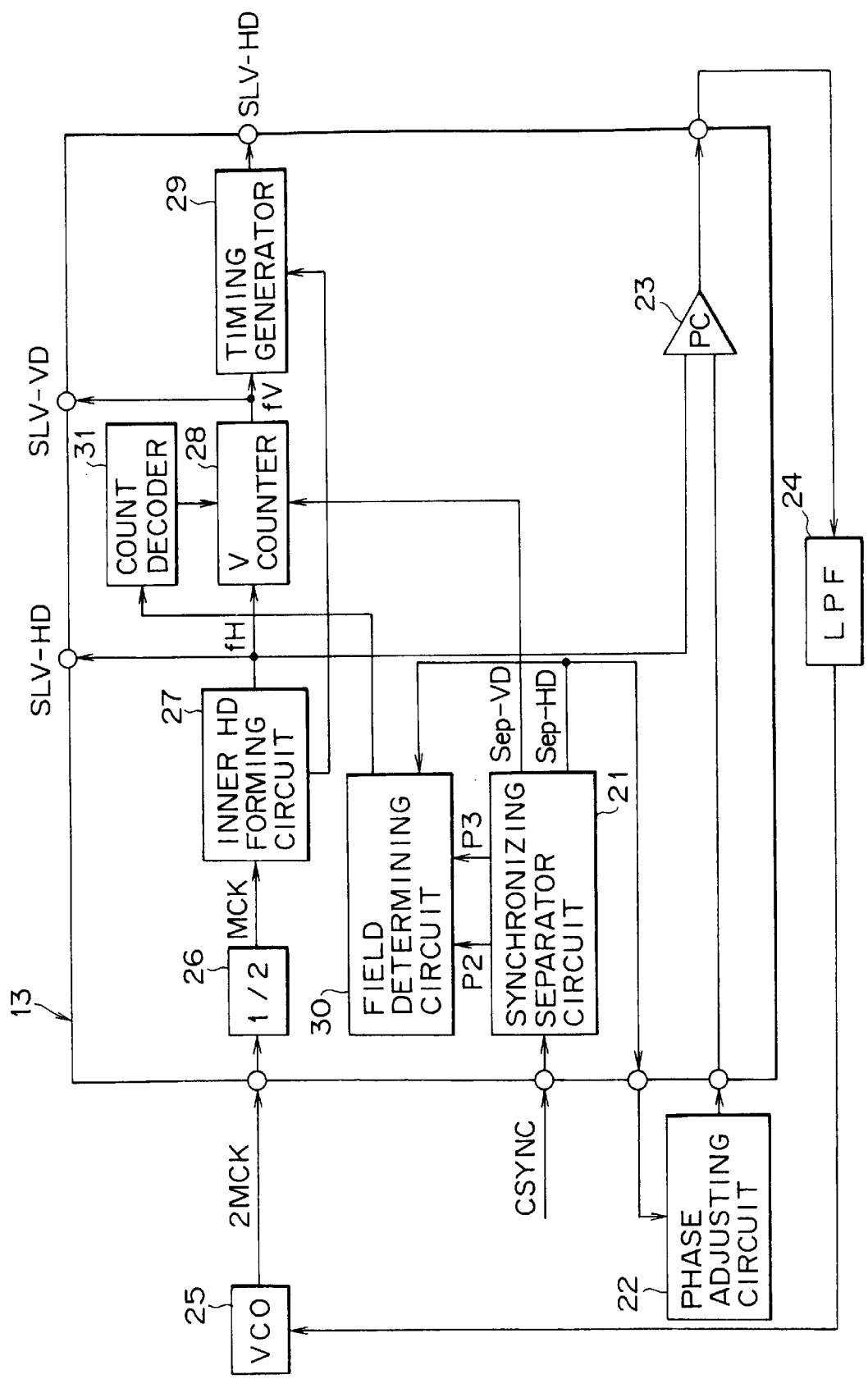
FIG. 2 is a block diagram showing a specific circuit constitution of a timing control circuit.

FIG. 2 shows a specific circuit constitution of the timing control circuit 13. The timing control circuit 13 is inputted with a compound synchronizing signal CSYNC provided from a master camera. The timing control circuit 13 is constituted to include a synchronizing separator circuit 21.

The synchronizing separator circuit 21 respectively separates a horizontal synchronizing signal HD and a vertical synchronizing signal VD included in the inputted compound synchronizing signal CSYNC. Hereinafter, the horizontal synchronizing signal HD and the vertical synchronizing signal VD which have been subjected to the synchronizing separation are described as a horizontal synchronizing signal Sep-HD and a vertical synchronizing signal Sep-VD. The horizontal synchronizing signal Sep-HD is temporarily outputted to outside of the timing control circuit 13.

Further, the horizontal synchronizing signal Sep-HD is subjected to phase adjustment by a phase adjusting circuit 22 installed outside of the timing control circuit 13, thereafter again inputted to the timing control circuit 13 and constitutes one input of a phase comparator (PC) 23. A comparison output from the phase comparator 23 is outputted to outside of the timing control circuit 13, smoothed by LPF (low pass filter) 24 and is provided to VCO (voltage control oscillator) 25 as its control voltage.

VCO 25 is oscillated by original oscillation clock 2MCK having a frequency twice as much as that of master clock MCK of 14 MHz which is the reference clock of the camera system and the oscillation frequency is changed in accordance with the control voltage. The original oscillation clock 2MCK is inputted to the timing control circuit 13, divided by ½ by a ½ divider 26 to thereby constitute the master clock MCK of 14 MHz and is provided to an inner HD forming circuit 27.

The inner HD forming circuit 27 forms a horizontal frequency signal fH having a period of 1H (H; horizontal scanning time period) by dividing the master clock MCK of 14 MHz, outputs the horizontal frequency signal fH to outside of the timing control circuit 13 as a slave horizontal synchronizing signal SLV-HD and is supplied to a V (vertical) counter 28 and a timing generator 29 and provided to the phase comparator 23 as other input thereof.

The phase comparator 23 compares phases of the horizontal synchronizing signal Sep-HD after phase adjustment constituting the one input and the horizontal frequency signal fH and supplies a comparison output in accordance with the phase difference to VCO 25 via LPF 24 as mentioned above.

That is, there is constituted a PLL (phase locked loop) circuit by a circuit system for forming the horizontal frequency signal fH based on the phase comparator 23, LPF 24, VCO 25 and the original oscillation clock 2MCK and providing the signal to the phase comparator 23. External synchronizing operation is carried out by the PLL circuit and the slave horizontal synchronizing signal SLV-HD is synchronized with the horizontal synchronizing signal Sep-HD after the phase adjustment.

The V counter 28 counts the horizontal frequency signal fH with the vertical synchronizing signal Sep-V provided from the synchronizing separator circuit 21 as a reset input, forms a vertical frequency signal fV based on the count value, outputs the vertical frequency signal fV to outside of the timing control circuit 23 as a slave vertical synchronizing signal SLV-Vd and supplies the vertical frequency signal fV to the timing generator 29. The timing generator 29 forms a slave compound synchronizing signal SLV-SYNC and outputs the slave compound synchronizing signal SLV-SYNC to outside of the timing control circuit 13.

The inside of the timing control circuit 13 is further installed with a field determining circuit 30 for determining whether a field in inputting the compound synchronizing signal CSYNC is an odd number field of an even number field. The field determining circuit 30 is a characterizing portion of the present invention and a detailed explanation will later be given of the specific circuit constitution and circuit operation thereof.

A result of determination from the field determining circuit 30 is provided to a count decoder 31. The count decoder 31 is for setting a reset value (load value) for loading to the V counter 28 when it is reset. The reset value is set with a value which differs depending on a phase state of the slave horizontal synchronizing signal SLV-HD relative to the horizontal synchronizing signal Sep-HD after the phase adjustment, that is, same phase or retarded phase or advanced phase and is set with a value which differs depending on whether the field is an odd number field or an even number field.

Therefore, there is needed the result of determining the field for the count decoder 31. Further, the count decoder 31 loads to the V counter 28 a reset value which differs in the case of the odd number field and in the case of the even number field based on the result of determination provided from the field determining circuit 30 in the reset operation of the V counter 28 based on the vertical synchronizing signal Sep-VD.

Next, an explanation will be given of a specific circuit constitution of the field determining circuit 30 according to the embodiment. The field determining circuit 30 is characterized in determining whether the field in inputting the compound synchronizing signal CSYNC is the odd number field or the even number field by using pulses P2 and P3 outputted from the synchronizing separator circuit 21.

Figure 3:
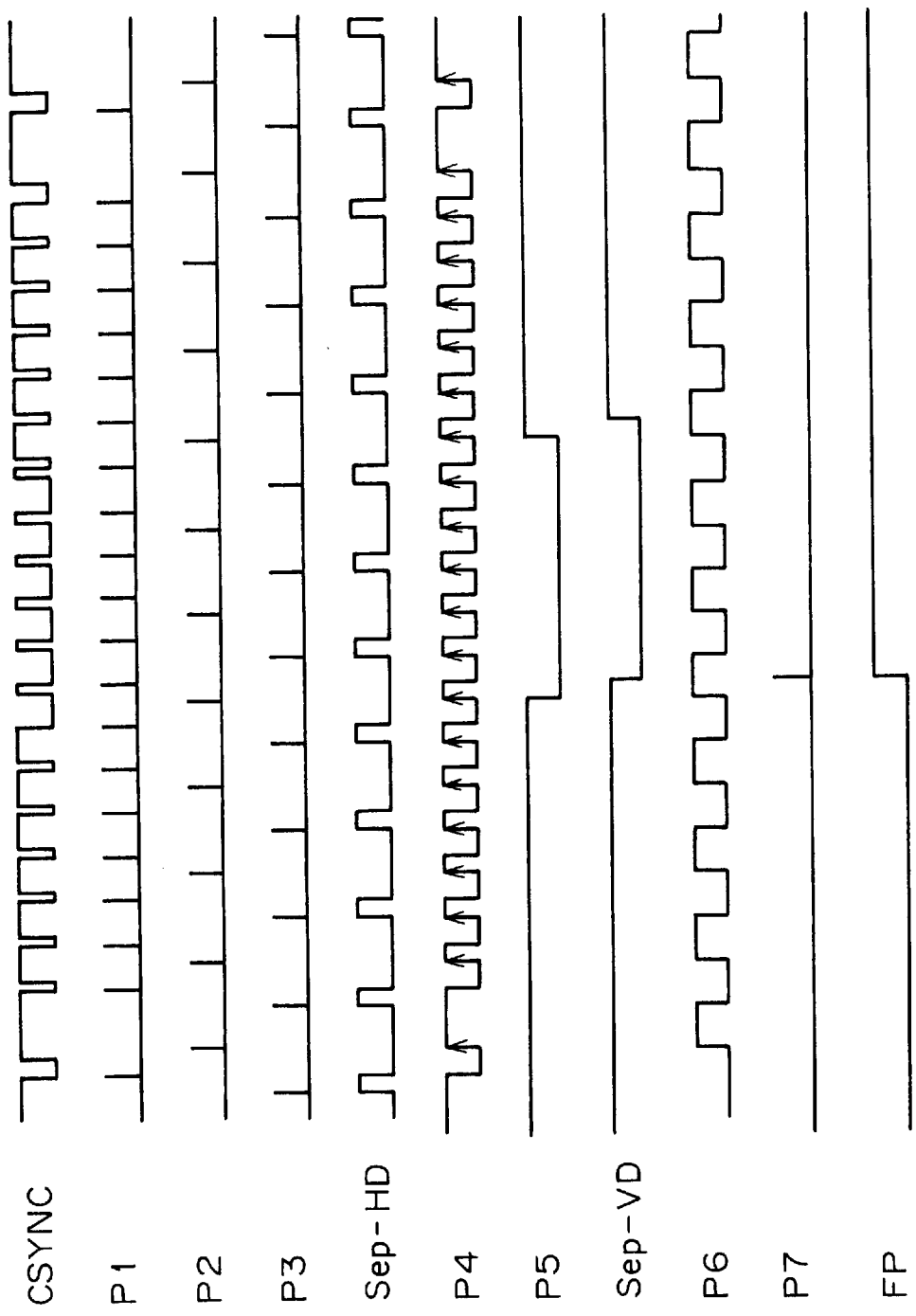
FIG. 3 illustrates timing charts showing a timing of determining a field in an ODD field of NTSC/EIA system.
Figure 4:
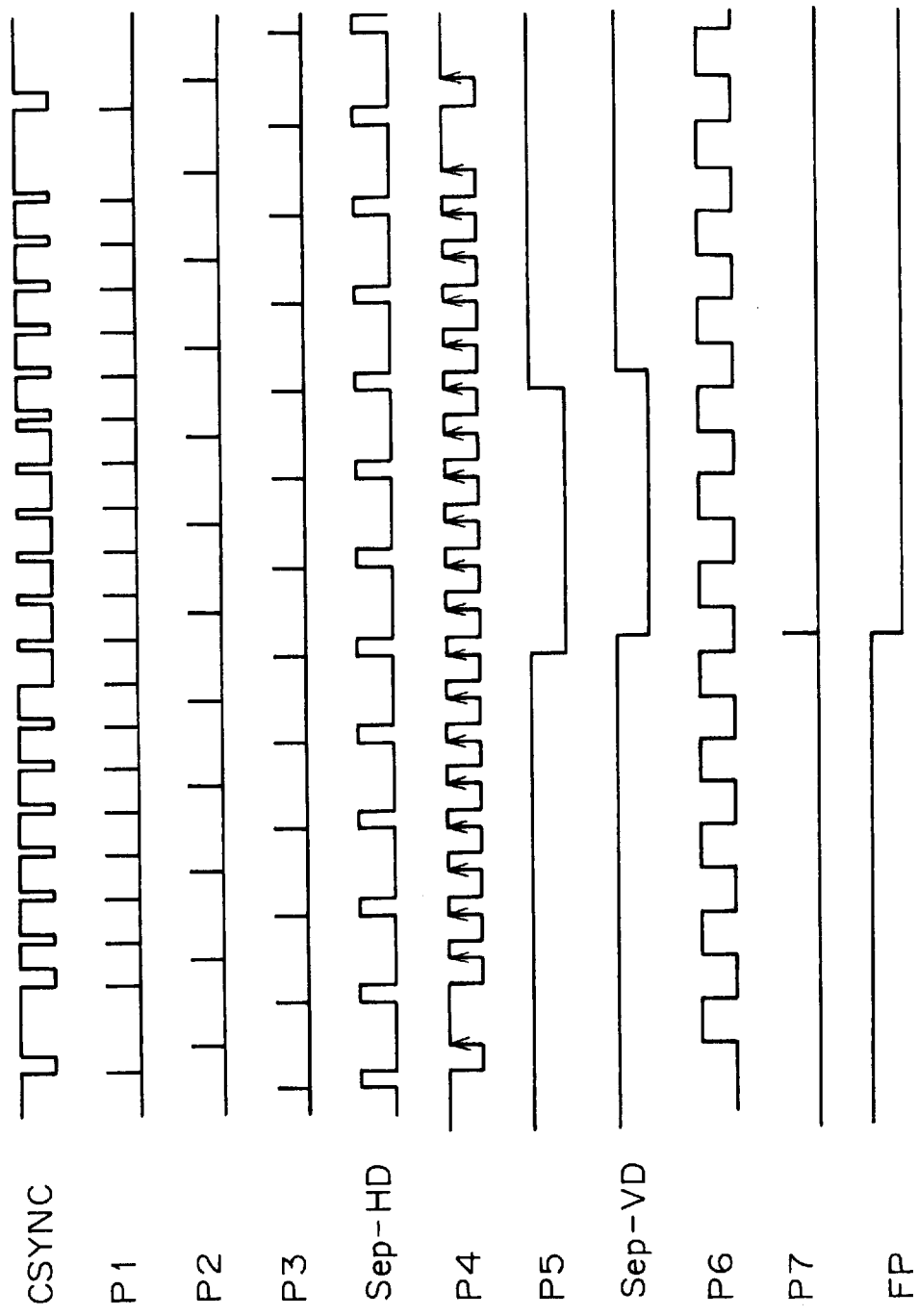
FIG. 4 illustrates timing charts showing a timing of determining a field in an EVEN field of NTSC/EIA system.

Here, before explaining the field determining circuit 30, an explanation will be given of operation of the synchronizing separator circuit 21 in reference to timing charts of FIG. 3 and FIG. 4. Incidentally, FIG. 3 shows a case of an odd number (ODD) field of NTSC (National Television System Committee)/EIA (Electronic Industries Association) and FIG. 4 shows a case of an even number (EVEN) field of NTSC/EIA, respectively. In this case, EIA refers to a black and white system in correspondence with NTSC.

The synchronizing separator circuit 21 forms a pulse P1 by detecting a rise edge of the compound synchronizing signal CSYNC and forms the pulses P2 and P3 with the pulse P1 in correspondence with a horizontal synchronizing portion of the compound synchronizing signal CSYNC as a reference substantially at respective intervals of ⅓H and ⅔ with 1H as a unit. As a result, pulse P2 and pulse P3 constitute a constant phase difference. Further, the horizontal synchronizing signal Sep-HD is separated from the compound synchronizing signal CSYNC by constituting a latch which is set at a timing of the pulse P3 and reset at a fall timing of the compound synchronizing signal CSYNC.

Further, a pulse P4 is formed by constituting a latch which is set at a timing of the pulse P2 or the pulse P3 and reset at a timing of the pulse P1. Further, a pulse P5 is formed by sampling the compound synchronizing signal CSYNC at a rise timing of the pulse P4. Further, by sampling the pulse P5 at the timing of the pulse P1, the vertical synchronizing signal Sep-Vd is separated from the compound synchronizing signal CSYNC.

In this way, the synchronizing separator circuit 21 for forming the pulses P1 through P5 at the various timings and separating the horizontal synchronizing signal Sep-HD and the vertical synchronizing signal Sep-VD from the compound synchronizing signal CSYNC based thereon, outputs the separated horizontal synchronizing signal Sep-HD and the separated vertical synchronizing signal Sep-VD and outputs the pulses P2 and P3 for being used for determining the field to the field determining circuit 30.

Figure 5:
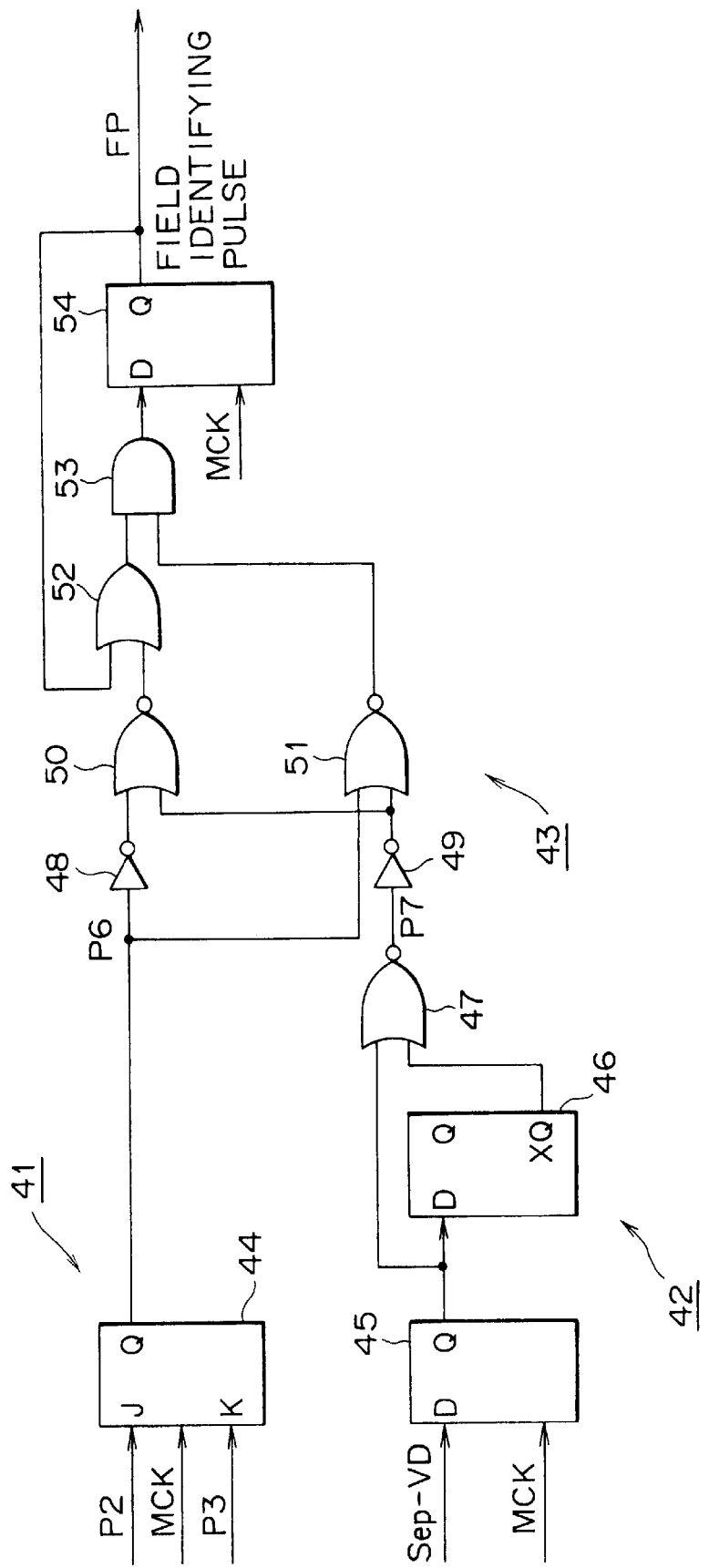
FIG. 5 is a block diagram showing an example of a circuit constitution of a field determining circuit according to an embodiment.
Figure 6:
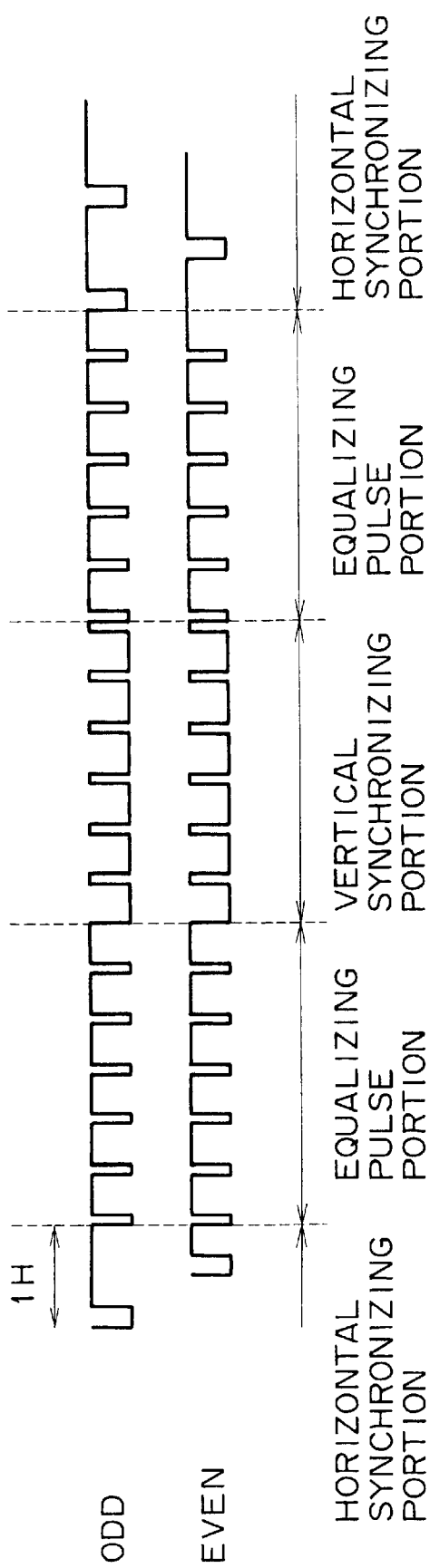
FIG. 6 is a signal waveform diagram of a vertical synchronizing portion of a television signal according to NTSC/EIA system.

The field determining circuit 30 determines the field by using the pulses P2 and P3 provided from the synchronizing separator circuit 21 and using the vertical synchronizing signal Sep-VD separated by the synchronizing separator circuit 21. FIG. 5 shows an example of a circuit constitution of the field determining circuit 30.

In FIG. 5, the field determining circuit 30 is constituted to include a first pulse forming circuit 41 inputting the pulses P2 and P3 and the master clock MCK for forming a pulse P6 having a pulse width in correspondence with the phase difference between the pulses P2 and P3, a second pulse forming circuit 42 for inputting the vertical synchronizing signal Sep-VD and the master clock MCK for forming a pulse P7 at a timing of fall of the vertical synchronizing signal Sep-VD and a third pulse forming circuit 43 for forming a field identifying pulse based on the pulses P6 and P7.

The first pulse forming circuit 41 is constituted by, for example, a JK flip flop 44 with the pulse P2 as J input, the pulse P3 as K input and the master clock MCK as clock input. The second pulse forming circuit 42 is constituted by, for example, a D flip flop 45 with the vertical synchronizing signal Sep VD as D input and the master clock MCK as clock input, a D flip flop 46 with Q output from the D flip flop 45 as D input and the master clock MCK as clock input and a two-input NOR gate 47 inputting Q output from the D flip flop 45 and XQ output from the D flip flop 46.

The third pulse forming circuit 43 is constituted by inverters 48 and 49 for inverting polarities of the pulses P6 and P7, a two-input NOR gate 50 for inputting respective outputs from the inverters 48 and 49, a two-input NOR gate 51 for inputting the pulse P6 and an output from the inverter 49, a two-input OR gate 52 with an output from the NOR gate 50 as one input, a two-input AND gate 53 with respective outputs from the NOR gate 51 and the OR gate 52 as inputs and a D flip flop 54 with an output from the AND gate 53 as D input and the master clock MCK as clock input in which Q output from the D flip flop 54 is led out as the field identifying signal FP and becomes other input of the OR gate 52.

Next, an explanation will be given of circuit operation of the field determining circuit 30 having the above-described constitution in reference to the timing charts of FIG. 3 and FIG. 4.

First, an explanation will be given of formation of the pulses P6 and P7. In the first pulse forming circuit 41, the JK flip flop 44 forms the pulse P6 which rises the timing of the pulse P2 and falls at the timing of the pulse P3 with the pulse P2 as J input and the pulse P3 as K input. The pulse P6 constitutes a pulse for determining the fields of ODD/EVEN.

In the meantime, in the second pulse forming circuit 42, the NOR gate 47 calculates negative OR of the latch output Q produced by latching the vertical synchronizing signal Sep-VD by the flip flop 45 and the latch inversion output XQ produced by latching the latch output Q by the D flip flop 46 to thereby form the pulse P7 detecting fall of the vertical synchronizing signal Sep-VD.

Successively, in the third pulse forming circuit 43, in the case of the ODD field shown by the timing charts of FIG. 3, both of the field determining pulse P6 and the VD fall detecting pulse P7 are at "H" level and accordingly, the field identifying pulse FP which is Q output from the D flip flop 54 becomes at "H" level. That is, the field identifying pulse FP at "H" level signifies the ODD field.

In the meantime, in the case of the EVEN field shown by the timing charts of FIG. 4, the field determining pulse P6 is at "L" level and the VD fall detecting pulse P7 is at "H" level and accordingly, the field identifying signal pulse FP which is Q output from the flip flop 54 becomes at "L" level. That is, the field identifying pulse FP at "L" level signifies the EVEN field.

As described above, according to a camera system using the compound synchronizing signal CSYNC as an external synchronizing signal, by utilizing singularities of a horizontal synchronizing pulse, a vertical synchronizing pulse and an equalizing pulse between ODD and EVEN fields of the compound synchronizing signal CSYNC and determining the fields by using the pulses P2 and P3 formed in a procedure of synchronizing separation in the synchronizing separator circuit 21, without using a counter as in the conventional technology, by a combination of simple logical circuits, whether a field in inputting the compound synchronizing signal CSYNC is an odd number field or an even number field can firmly be determined.

Further, the circuit constitution of the field determining circuit 30 shown by FIG. 5 is only an example and the present invention is not limited thereto. In sum, there may be constructed a circuit constitution for forming the field determining pulse P6 based on the pulses P2 and P3 provided from the synchronizing separator circuit 21 and forming the VD fall detecting pulse P7 at fall of the vertical synchronizing signal Sep-VD by which the polarity of the field determining pulse P6 can be identified at the timing of the Sep-VD fall detecting pulse P7.

Further, although according to the above-described embodiment, an explanation has been given of the case applied to NTSC/EIA as a television system, the present invention is basically applicable to any system of carrying out interlaced scanning such as PAL (phase alternating by line system)/CCIR (Comite' Consultatif Internationale des Radiocommunication). In this case, CCIR refers to a black and white system in correspondence with PAL.

As has been explained, according to the present invention, in an external synchronizing system of a camera system using a compound synchronizing signal as an external synchronizing signal, by constructing a constitution utilizing singularities of a horizontal synchronizing pulse, a vertical synchronizing pulse and an equalizing pulse between ODD and EVEN fields of the compound synchronizing signal and determining the fields by utilizing pulses formed in a procedure of synchronizing separation, without using a counter as in the conventional technology, by a combination of simple logical circuits, whether a field in inputting the compound synchronizing signal is an odd number field or an even number field can firmly be determined and accordingly, the circuit constitution can be simplified and low cost formation can be achieved.

What is claimed is:

1. A camera system for forming an internal horizontal synchronizing signal and an internal vertical synchronizing signal based on a compound synchronizing signal including a horizontal synchronizing signal and a vertical synchronizing signal provided externally for carrying out an operation of the camera system in synchronism with the formed internal horizontal synchronizing signal and the formed internal vertical synchronizing signal, said camera system comprising:

a synchronizing separator circuit for separating the horizontal synchronizing signal and the vertical synchronizing signal from the compound synchronizing signal and outputting a first and a second pulse having a constant phase difference therebetween with one horizontal scanning time period as a unit with a horizontal synchronizing portion of the compound synchronizing signal as a reference;

a field determining circuit comprising:
  a first pulse forming circuit comprising a flip flop that receives as inputs said first and second pulses and a master clock, for forming a third pulse having a pulse width in correspondence with the phase difference between the first and the second pulses;
  a second pulse forming circuit for forming a fourth pulse at a timing of fall of the vertical synchronizing signal separated by the synchronizing separator circuit; and
  a third pulse forming circuit for forming a field identifying pulse based on the third pulse and the fourth pulse.

2. The camera system according to claim 1:
wherein said second pulse forming circuit comprises a first D flip flop with said vertical synchronizing signal applied as a D input and said master clock as a clock input, a second D flip flop with Q output from said first D flip flop as D input and said master clock as clock input, and a two-input NOR gate inputting Q output from said first D flip flop.

3. The camera system according to claim 1, wherein said third pulse forming circuit comprises:
first and second inverters for inverting polarities of said third and fourth pulses, respectively;
a first two-input NOR gate for inputting respective outputs from said inverters;
a second two-input NOR gate for inputting said third pulse and an output from said first inverter;
a two-input OR gate with an output from said first NOR gate as one input;
a two-input AND gate with respective outputs from said second NOR gate and said OR gate as inputs, and
a D flip flop with an output from said AND gate as D input and said master clock as clock input.

4. The camera system according to claim 1, further comprising:
a PLL circuit by a circuit system for forming a horizontal frequency signal based on a phase comparator, LPF, VCO, and an original oscillation clock and providing a signal to the phase comparator.

5. An external synchronizing system for forming an internal horizontal synchronizing signal and an internal vertical synchronizing signal in a slave apparatus based on a compound synchronizing signal and a vertical synchronizing signal provided from a master apparatus for operating the slave apparatus in synchronism with the internal horizontal synchronizing signal and the internal vertical synchronizing signal:

wherein the slave apparatus comprising:
  a synchronizing separator circuit for separating the horizontal synchronizing signal and the vertical synchronizing signal from the compound synchronizing signal and outputting a first and a second pulse having a constant phase difference therebetween with one horizontal scanning time period as a unit with a horizontal synchronizing portion of the compound synchronizing signal as a reference;

a field determining circuit comprising:
  a first pulse forming circuit comprising a flip flop that receives as inputs said first and second pulses and a master clock, for forming a third pulse having a pulse width in correspondence with the phase difference between the first and the second pulses;
  a second pulse forming circuit for forming a fourth pulse at a timing of fall of the vertical synchronizing signal seperated by the synchronizing seperator circuit; and
  a third pulse forming circuit for forming a field identifying pulse based on the third pulse and the fourth pulse.

6. The external synchronizing system according to claim 5:
  wherein the master apparatus is a camera and the slave apparatus is one or more of cameras or VCRs.

7. The external synchronizing system according to claim 5:
  wherein the master apparatus is a VTR and the slave apparatus on or more of VCRs.

8. The external synchronizing system according to claim 5, wherein said second pulse forming circuit comprises a first D flip flop with said vertical synchronizing signal as D input and said master clock as clock input, a second D flip flop with Q output from said first D flip flop as D input and said master clock as clock input, and a two-input NOR gate inputting Q output from said first D flip flop.

9. The external synchronizing system according to claim 5, wherein said third pulse forming circuit comprises:
  first and second inverters for inverting polarities of said third and fourth pulses, respectively;
  a first two-input NOR gate for inputting respective outputs from said inverters;
  a second two-input NOR gate for inputting said third pulse and an output from said first inverter;
  a two-input OR gate with an output from said first NOR gate as one input;
  a two-input AND gate with respective outputs from said second NOR gate and said OR gate as inputs, and
  a D flip flop with an output from said AND gate as D input and said master clock as clock input.

10. The external synchronizing system according to claim 5, further comprising:
  a PLL circuit by a circuit system for forming a horizontal frequency signal based on a phase comparator, LPF, VCO, and an original oscillation clock and providing a signal to the phase comparator.

* * * * *